INVENTOR
Reinhold Szonn

April 2, 1963 R. SZONN 3,083,583
ELASTIC TOOTH MEANS
Filed June 6, 1961 3 Sheets-Sheet 2

INVENTOR
Reinhold Szonn

April 2, 1963 R. SZONN 3,083,583
ELASTIC TOOTH MEANS
Filed June 6, 1961 3 Sheets-Sheet 3
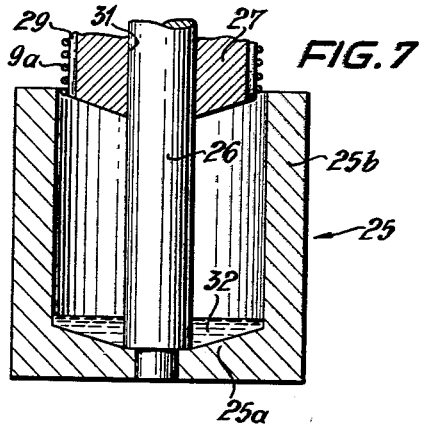
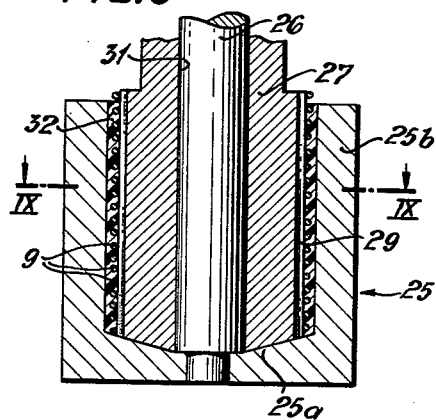
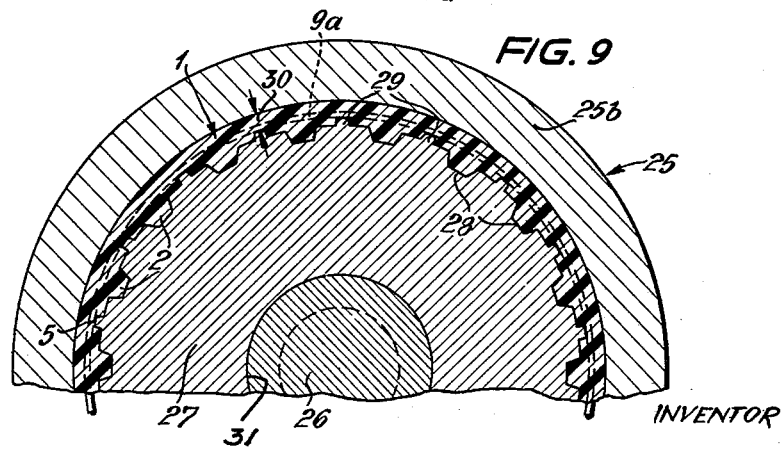
INVENTOR
Reinhold Szonn
By Walter Bixley

PATENTED APR. 2, 1963   3,083,583

3,083,583
ELASTIC TOOTH MEANS
Reinhold Szonn, Lemforde, Kreis Diepholz, Germany, assignor to Wilhelm Herm. Muller & Co. Kommanditgesellschaft, Hannover, Germany
Filed June 6, 1961, Ser. No. 115,144
Claims priority, application Germany Jan. 12, 1956
3 Claims. (Cl. 74—229)

The present invention relates to belts especially conveyor belts and, more specifically, concerns a precision belt gear transmission in which the belt consists of an elastic material as for instance rubber or an elastic synthetic material such as polyurethane elastomers, provided with trapezoidal elastic teeth having transverse notches respectively arranged between the belt teeth and located in and extending over the entire bottom of the tooth spaces of said belt, said teeth meshing with gears having trapezoidal tooth spaces for receiving the elastic belt teeth. This application is a continuation-in-part application of my co-pending application Ser. No. 633,232, filed January 9, 1957, now Patent 2,987,932.

It is known to provide toothed belts of elastic material with inserts extending in the longitudinal direction of the belts, in order to increase the strength of the belts and to prevent any longitudinal extensibility of the belt in order to prevent any deviation in the pitch of the belt teeth and the tooth spaces of the gear cooperating therewith during the operation of the belt. Such inserts may in a manner known per se consist of wire strands, not extensible or hardly extensible bands or strips of synthetic material or textile material or the like, or may also consist of thin wires.

However, experience has shown that the problem of maintaining a precision pitch cooperation between the belt teeth and the tooth spaces of the gear cannot be solved by eliminating longitudinal extension of toothed belts the back of which consists of elastic compressible material as it is the case with such toothed belts with which the flexible teeth and tooth back are made of one and the same rubber or synthetic material. It has been found that, depending on the magnitude of the respective pulling force acting on the belt, the back of the belt is compressed to a more or less extent as a result of which a noncontrollable radial displacement of the neutral zone relative to the central axis of the gear will be obtained so that the deformable belt teeth will not harmonize any longer at a precise pitch with the teeth spaces of the gear. This lack of precision in the pitch makes itself felt unfavorably with large looping angles, especially with gears of larger size, because in such instances, no uniform deformation of the flanks of the elastic belt teeth will take place. As a result thereof, the cooperation of the belt teeth with the gear and the quiet running of the belt transmission is greatly affected.

It is, therefore, an object of the present invention to provide a precision belt gear system which will overcome the above mentioned drawbacks.

It is a further object of this invention to provide a precision toothed belt transmission in which the neutral zone of the belt back will have a uniform constant radial distance from the central axis of the gear within the range of the looping angle at a normal load on the belt transmission.

It is a further object of this invention to provide a precision toothed belt transmission, in which the elastic belt teeth will cooperate with the tooth spaces of the gear at full pitch precision so that the lastic deformation of the flanks of the belt teeth will occur in conformity with a pre-calculated precision.

These and other objects and advantages of the invention will appear more clearly from the following specification in connection with the accompanying drawings, in which:

FIG. 7 illustrates a vertical central section through a mold for use in connection with the present invention, the central portion of said mold occupying its starting position.

FIG. 8 is a central longitudinal section through the mold similar to that of FIG. 7, however, with the central mold portion occupying its innermost or end position.

FIG. 9 illustrates a section taken along the line IX—IX of FIG. 8 but on a larger scale than that of FIG. 8.

Figure 1:
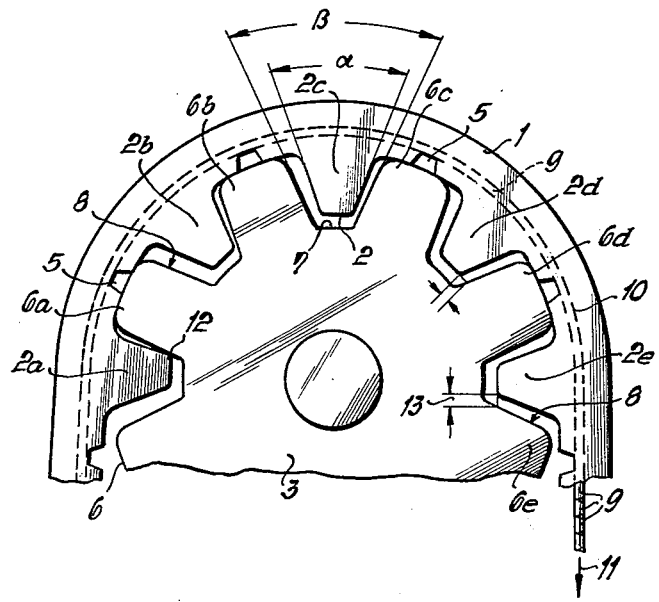
FIG. 1 illustrates a portion of a precision belt transmission according to the invention while being under very slight load.

The belt transmission according to the present invention comprsing a belt of elastic material or elastic synthetic material and a gear meshing with the teeth of said belt is characterized primarily in that the grooves or notches respectively arranged between the teeth of the belt and, more specifically, at the bottom of the tooth spaces of the belt while extending in transverse direction to the longitudinal direction of the belt have such a depth that the reinforcing inserts provided in the neutral zone of the back of the toothed belt extend to the bottom of the transverse grooves. In this way, while maintaining a good flexibility of the toothed belt, the elevational section of the belt back which section is located below hte reinforcing insert and acts as compressible cushion will be determined and will have a predetermined magnitude so that the neutral zone of the back of the belt will at all points have a uniform constant radial distance from the central axis of the gear within the range of the looping angle when the belt is under normal load. Furthermore, the belt will within its looping range always have the same circumferential length. Therefore, the elastic belt teeth will cooperate with the tooth spaces of the gear at a completely precise pitch, and the elastic deformations on the flanks of the belt teeth will be able to occur in conformity with a precalculated accuracy and law.

When the belt is subjected to a shock-like overload, the elastic material of that elevational section of the belt back which is located below the reinforcing insert will be able to escape into the transverse notches to an extent dependent on the depth of the transverse notches. In this way likewise a uniform deformation will be produced according to which the neutral zone determined by the reinforcing inserts will extend along a circular line located precisely concentrically with regard to the central axis of the gear.

If the reinforcing inserts are free at the bottom of the transverse grooves, the manufacturing conditions will be such that the reinforcing inserts may be arranged in the neutral zone of the back of the toothed belt in such a precise manner as it is indispensable for the desired success of a precise pitch cooperation of the belt teeth and the tooth spaces of the gear.

A further improvement in the cooperation of the teeth of the toothed belt and the tooth spaces of the gear at a precise pitch will be obtained by arranging the trapezoidal teeth of the toothed belt in conformity with a pitch which is smaller by a constant amount than the pitch of the tooth spaces of the gear on the pitch circle common to the belt teeth and gear teeth for the ordinary load.

In this way, with a looping range of the toothed belt which looping range has its neutral circumferential line follow a circular section precisely concentrically located with regard to the gear axis, the trapezoidal belt teeth will, when passing over the gears, successively and uniformly be deformed and will successively be uniformly loaded.

In this connection it is of importance that the differential amounts in the pitch of the belt teeth and in the pitch of the tooth spaces, which amounts are only very small, will be kept uniform. This requirement has above all to be met for the reason that the belt transmission will properly work under overload. For toothed belts which embrace the gears pertaining thereto over a greater loop, and for toothed belts of considerable width, it is of great importance as far as the running precision is involved that the said requirement be met. Due to the reinforcing inserts embedded in the back of the belt at uniform elevational level, this requirement can properly be met.

Referring now to the drawings in detail, the belt which may consist of rubber or thermoplastic synthetic material, such as for instance polyurethane elastomers, is designated with the reference numeral 1 throughout the drawings. This belt is provided with belt teeth 2a, 2b, 2c, 2d, 2e which consist of the same materials as the belt and have been made of one piece therewith. The teeth of the belt are of trapezoidal shape. The gear 3 meshing with said belt is provided with trapezoidal tooth spaces 7 to be engaged by the teeth 2a, 2b, . . . 2e and are located between gear teeth 6, 6a, 6b, 6c, 6d, 6e. As will be evident from the drawings, the tooth spaces 7, when looking in circumferential direction, are wider than the thickness of the belt teeth 2a, . . . 2e. The straight line flanks 8 of the teeth 6 of the gear are so designed that the tooth space angle $\beta$ is greater than the tooth angle $\alpha$ of the belt teeth 2a, . . . 2e. This is particularly clearly shown in FIG. 1. The tooth angle $\alpha$ of the belt teeth may be approximately 40° and the tooth space angle $\beta$ of gear 3 may be approximately 50°. Moreover, the belt teeth 2a, 2b . . . 2e are, as shown in FIGS. 1 to 3, arranged with a somewhat lower pitch than the teeth 6, 6a, 6b . . . 6e and the tooth spaces 7 of gear 3.

Figure 5:
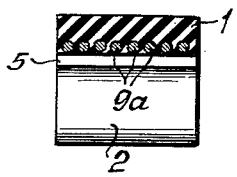
FIG. 5 is a cross section taken along the line V—V of FIG. 3.
Figure 6:
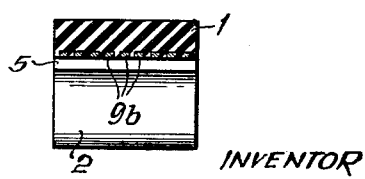
FIG. 6 is a cross section similar to that of FIG. 5 but somewhat modified thereover.

Embedded in the toothed belt 1 are insert elements 9 which may consist for instance of helical windings of adjacent metal wires 9a (see FIG. 5), textile threads, strips of non-extensible or hardly extensible synthetic material, or also of a wire mesh, textile or synthetic material insert layer 9b (see FIG. 6). Such insert layer extends over the entire width of the toothed belt 1 but may be so perforated that the elevational layers of the belt body on both sides of the layer 9 form a firmly coherent homogeneous unit. The reinforcing insert layer 9, when manufacturing the belt 1, is mounted in the elastic material forming said layer in such a way that said layer will be located in the region of the neutral zone 10 of toothed belt 1. By neutral zone 10 is meant that zone of the back of the belt in which up to the normal strong load for which the belt transmission has been dimensioned and designed, neither tensile nor shearing stresses will occur in short, the neutral axis. The precise installation of the insert elements 9a or 9b in the region of the neutral zone 10 is made possible according to the present invention by providing in the mold for the belt at the bottom of the tooth spaces between each two successive belt teeth a core mass corresponding to the groove or notch 5. Consequently, in the mold in which the belt 1 is to be made, first the reinforcing insert layers 9 may be properly located by winding them over the core masses. For instance the metal wires 9a may in uniform windings be wound around mandrels over the core masses or the wire fabric 9b may be wound around mandrels over the core masses. Thereupon the thus positioned metal wires are then surrounded by the belt material which is poured into the mold so that said material will envelope said metal wires and form the belt 1. In this connection it is to be assured that the reinforcing insert layer element 9 will be embedded in the region of the plane of the neutral zone 10 of belt 1. Instead of providing one groove or notch, it is also possible to provide two or more grooves or notches 5 between each two successive belt teeth 2a . . . 2e. In addition to the above mentioned manufacturing goal, the grooves 5 will also in cooperation with the insert elements 9a, 9b precisely fixed in their position be of great importance for the intended improved operation of toothed belts of elastic material. In addition thereto, the following should be noted in connection with FIGS. 1 to 4.

FIG. 1 illustrates the instance where the belt is under the lightest load, for instance during the idling of the belt transmission, according to which the elastic belt teeth 2, 2a, 2b . . . 2e will not be subjected to elastic deformations when meshing with the tooth spaces 7 of gear 3. Belt 1 will by the belt pulling force 11 have its neutral zone 10 bent around the gear 3. In this instance merely the belt tooth 2a engages tooth 6a of gear 3 at point 12. The belt teeth 2b, 2c, 2d, 2e do not engage or press against the teeth 6b, 6c, 6d, 6e of the gear. The distance 13 from the tip of the belt tooth 2e to tooth 6e of gear 3 is greater than the corresponding distance with the belt tooth 2d which latter is greater than with the belt tooth 2c while the latter is again greater than with the belt tooth 2b. This gradual spacing of the belt teeth 2, 2a . . . 2e from the teeth 6 of gear 3 following the meshing at belt tooth 2a is obtained by the fact that the pitch of the teeth 6 of gear 3 is slightly greater than the pitch of teeth 2 of belt 1.

Figure 2:
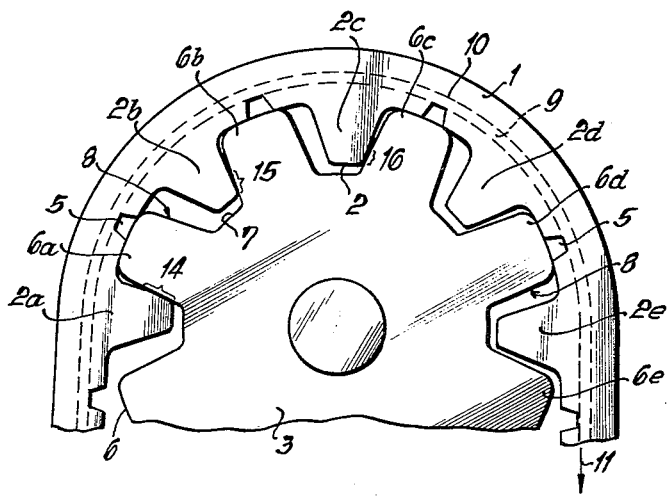
FIG. 2 illustrates a portion of the belt transmission of FIG. 1 but at a greater load acting on the belt.
Figure 3:
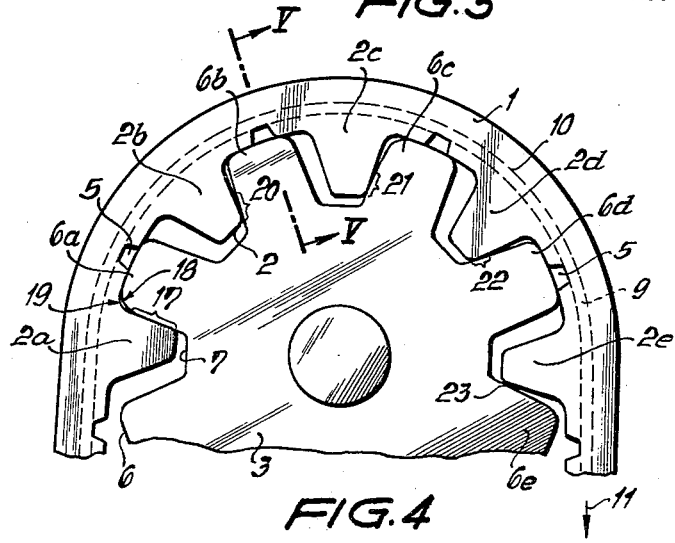
FIG. 3 illustrates a portion of the belt transmission of FIG. 1 at normal load.

FIG. 2 shows the cooperation of belt 1 with gear 3 under a somewhat greater load than in FIG. 1. The belt pulling force 11 is greater than the belt pulling force under the conditions assumed in FIG. 1. Consequently, also the reaction force of gear 3 is greater. Tooth 2a will due to the deformation brought about by the belt pulling force 11 have its surface 14 engage the tooth 6a of gear 3 which corresponds to approximately ⅔ of the height of the belt tooth 2a. The driving surface 15 of tooth 2b is due to the smaller deformation less than the contact surface 14 of belt tooth 2a. The belt tooth 2c engages the gear only along a small surface 16 at the tip of the gear tooth. The belt tooth 2d does not engage or is slightly spaced from gear tooth 6d. The belt tooth 2e is already considerably spaced from the tooth flank 8 of tooth 6e of gear 3 in the direction of the belt pulling force 11.

FIG. 3 illustrates the cooperation of the toothed belt 1 with gear 3 under normal load which may be considered the normal permanent load. The belt tooth 2a will almost over its entire available flank surface 17 engage the counter flank 8 of the gear tooth 6a. Merely a slight spacing at the head of the tooth 6a of gear 3 will be noted which is due to the fact that the rounding 18 at the tooth head of tooth 6a is customarily somewhat greater than the rounding 19 at the bottom of the tooth space of belt 1. The magnitude of the contacting surfaces 20, 21, 22 of the belt teeth 2b, 2c, 2d decreases successively, and tooth 2e has just a slight contact with tooth 6e of gear 3 at point 23.

Figure 4:
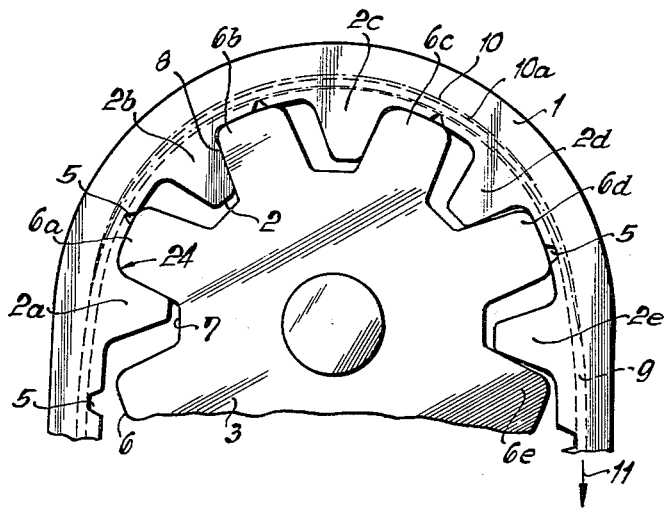
FIG. 4 shows the belt transmission of FIG. 1 under overload.

FIG. 4 illustrates the cooperation of the belt 1 with gear 3 under heavy load. This load condition may occur when the force of the belt pulling forces 11 increases in a shock-like manner and is generally of a short duration only. In such an instance, the belt tooth 2a will be deformed to such an extent that also at the head of tooth 6a of gear 3 no air gap will be present but the belt tooth 2a and gear tooth 6a will contact each other completely at 24. All other belt teeth 2b, 2c, 2d and also 2e will over their complete or larger flank surfaces engage the gear flanks 8 of gear teeth 6b, 6c, 6d and 6e. The belt pulling force 11 will under overload condition be so great that due to the engaging pressure of the belt 1 upon gear 3, the material below the reinforcing insert layer 9 on the back of the belt will be deformed into the free space of the grooves 5. The neutral zone 10 will in this way be displaced closer to gear 3 on line 10a (see FIG. 4).

The elevational layer of the belt back below the insert layer 9, which layer acts as elastic cushion when shock peaks occur, in addition to the deformations of the belt teeth caused by the elasticity of the belt teeth 2 and notches 5, will considerably aid in causing the belt transmission with elastic belt 1 to work properly also when the belt is overloaded for brief periods of time.

With regards to FIGS. 7 to 9, the mold 25 for making a belt according to the invention comprises primarily a pot-shaped outer mold portion 25b the bottom 25a of which is provided with a guiding mandrel 26 arranged coaxially with regard to the mold portion 25b. The mandrel 26 may be connected to the bottom 25a in any convenient manner, for instance by press-fitting or welding. The mandrel 26 serves for centering and guiding the mold in the portion 27 which is designed as a cylindrical hollow body. The outer periphery of the mold in the portion 27 is provided with tooth-like protrusions 31 and tooth spaces 28 in conformity with the tooth spaces and teeth of the synthetic belt 1 to be produced. Between the tooth spaces 28, the tooth-like protrusions 31 are provided with protruding noses 29 which will form the transverse notches between the belt teeth 2 of the finished belt.

Prior to introducing the inner mold portion 27 into the outer mold portion 25, a wire 9a, a thread or the like, is wound around the mold inner portion 27 over the noses 29 in helical windings. However, instead also a wire mesh or a mesh structure of synthetic material may take the place of said wire 9a. The wire, thread or mesh 9a is in conformity with the height of the noses 29 held in a certain intermediate position within the free annular space 30 between the inner mold portion 27 and the outer mold portion 25. If now the inner mold portion 27 is moved from its FIG. 7 position into the outer mold portion 25 along the mandrel 26, the liquid synthetic material 32 which prior thereto has been filled into the outer mold portion 25 will be displaced by the inner mold portion 27 so as to flow into the free annular chamber 30 between the outer mold portion and the inner mold portion and also into the tooth spaces 28 so as to fill the same while no air enclosures or air bubbles will form. With the completed synthetic sleeve from which the individual endless toothed belts 1 are cut according to the desired width, the reinforcing inserts 9a which extend up to the transverse notches 5 will then be located precisely in the zone which with the toothed belt under normal load will form the neutral zone.

It is, of course, to be understood that the present invention is, by no means, limited to the particular construction shown in the drawings but also comprises any modifications within the scope of the appended claims.

What I claim is:

1. For use in connection with a gear having trapezoidal tooth spaces, a toothed precision belt comprising a body of elastic material, said body having trapezoidal teeth integral therewith on one side and spaced from each other by tooth spaces for meshing with said gear, each of said tooth spaces having arranged in the bottom portion thereof a groove extending transverse to the longitudinal direction of said belt over the width of said belt, and reinforcing insert means embedded in the neutral zone of said body and extending longitudinally thereof, the depth of said grooves being such as to extend up to said reinforcing insert means.

2. In combination: a belt of elastic material comprising a body provided with elastic trapezoidal teeth evenly spaced from each other by tooth spaces, a spur gear having teeth in mesh with the respective adjacent tooth spaces of said belt, each two adjacent flanks respectively pertaining to two adjacent teeth of said gear confining with each other an angle larger than the angle defined by the flanks of each belt tooth, each of said tooth spaces having arranged in the bottom portion thereof a groove extending transverse to the longitudinal direction of said belt and over the width of said belt, and reinforcing insert means embedded in the neutral zone of said body and extending longitudinally thereof, the depth of said grooves being such as to extend up to said reinforcing insert means.

3. In combination: a belt comprising a body of elastic material having elastic trapezoidal teeth projecting from one side spaced from each other by tooth spaces, a spur gear having teeth in mesh with the respective adjacent tooth spaces of said belt, each of said tooth spaces having arranged in the bottom portion thereof a groove extending transverse to the longitudinal direction of said belt over the width of said belt, and reinforcing insert means embedded in the neutral zone of said body and extending longitudinally thereof, the depth of said grooves being such as to extend up to said reinforcing insert means, said trapezoidal teeth of said belt having a pitch less by a predetermined constant amount than the pitch of the tooth spaces of said spur gear measured along the common pitch circle for said belt teeth and the teeth of said gear.

References Cited in the file of this patent

UNITED STATES PATENTS

| 2,934,967 | Worral | May 3, 1960 |
| 2,987,932 | Szonn | June 13, 1961 |

FOREIGN PATENTS

| 1,193,326 | France | Apr. 27, 1959 |